(12) United States Patent
Mordukhovich

(10) Patent No.: US 7,886,885 B2
(45) Date of Patent: Feb. 15, 2011

(54) CLUTCH FOR A TRANSMISSION

(75) Inventor: Gregory Mordukhovich, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 701 days.

(21) Appl. No.: 11/780,319

(22) Filed: Jul. 19, 2007

(65) Prior Publication Data

US 2008/0087518 A1  Apr. 17, 2008

Related U.S. Application Data

(60) Provisional application No. 60/829,554, filed on Oct. 16, 2006.

(51) Int. Cl.
*F16D 13/64* (2006.01)
*F16D 13/74* (2006.01)
*F16D 69/02* (2006.01)

(52) U.S. Cl. .............. 192/52.6; 192/70.14; 192/107 C; 192/107 M; 192/113.36

(58) Field of Classification Search .............. 192/52.6, 192/107 C, 107 M, 70.14
See application file for complete search history.

(56) References Cited

U.S. PATENT DOCUMENTS

| 1,081,998 | A | * | 12/1913 | Whitcomb | 192/107 R |
|---|---|---|---|---|---|
| 2,122,405 | A | | 7/1938 | Bockius et al. | |
| 2,767,817 | A | * | 10/1956 | Davis | 192/107 R |
| 3,397,761 | A | * | 8/1968 | Lindquist | 192/107 C |
| 3,746,139 | A | * | 7/1973 | Bok et al. | 192/107 R |
| 3,936,552 | A | * | 2/1976 | Krupp et al. | 428/66.2 |
| 4,202,432 | A | * | 5/1980 | Komori | 192/107 M |
| 4,291,794 | A | * | 9/1981 | Bauer | 192/107 M |
| 4,473,140 | A | * | 9/1984 | Komori | 188/250 G |
| 4,615,427 | A | * | 10/1986 | Majima | 192/107 M |
| 4,741,424 | A | * | 5/1988 | Kitano et al. | 192/107 M |
| 4,907,677 | A | * | 3/1990 | Yamashita et al. | 188/73.1 |
| 5,495,927 | A | * | 3/1996 | Samie et al. | 192/70.12 |
| 5,676,577 | A | | 10/1997 | Lam | |
| 5,799,763 | A | * | 9/1998 | Dehrmann | 192/3.29 |
| 5,998,307 | A | | 12/1999 | Lam | |
| 6,001,750 | A | * | 12/1999 | Lam | 442/72 |
| 6,102,443 | A | | 8/2000 | Lang, Jr. | |
| 6,130,176 | A | | 10/2000 | Lam | |
| 2004/0050646 | A1 | * | 3/2004 | Matthes et al. | 192/107 R |
| 2006/0102443 | A1 | * | 5/2006 | Kinoshita et al. | 192/70.14 |
| 2009/0000899 | A1 | * | 1/2009 | Paterra et al. | 192/70.14 |

FOREIGN PATENT DOCUMENTS

| DE | 602 10 172 T2 | 12/2006 |
|---|---|---|
| EP | 0 267 027 A2 | 11/1988 |
| WO | WO 2008/054433 A1 | 5/2008 |

* cited by examiner

*Primary Examiner*—David D Le
*Assistant Examiner*—Terry Chau

(57) ABSTRACT

The clutch of the present invention has a reaction plate, a friction plate, a friction layer, at least one non-compressible member, and a fluid lubricant. The friction plate is disposed adjacent the reaction plate for frictionally engaging the reaction plate to transfer a driving torque between the reaction plate and the friction plate when the compression force is applied. The friction layer has at least one groove. The at least one non-compressible member is disposed in the at least one groove for preventing further compression of the friction layer by the reaction plate. The at least one non-compressible member is adhered to the friction plate and a fluid lubricant is disposed between the reaction plate and the friction plate for providing a lubrication layer between the plates.

15 Claims, 2 Drawing Sheets ial Application No. 60/829,554, filed on Oct. 16, 2006.
CLUTCH FOR A TRANSMISSION

CROSS-REFERENCE TO RELATED APPLICATIONS

The present application claims the benefit of U.S. Provisional Application No. 60/829,554, filed on Oct. 16, 2006. The disclosure of the above application is incorporated herein by reference.

TECHNICAL FIELD

The present invention relates to a torque-transmitting device and to clutches or brakes for controlling the operation of the mechanisms such as transmissions or limited slip differentials.

BACKGROUND

Torque transmitting devices such as clutches or brakes are used throughout the automotive industry. For example, vehicle transmissions employ multiple clutches to engage and disengage the gearsets of the transmission to provide forward and reverse gear ratios.

Generally, a clutch includes a friction plate and a reaction plate. The friction plate has a layer of friction material attached to the surface that opposes the reaction plate. Conventional friction materials are (a) cellulose/Kevlar/resin based materials; (b) sintered metallic fiber friction materials; and (c) woven carbon fiber friction materials.

Cellulose/Kevlar/resin based materials are cost effective, provide high torque capacity, are porous, offer elastic structure capable of excellent load distribution without losing permeability as long as the local load is below the elasticity limits. However, local overloading leads to restricted fluid supply through the porous structure to the surface as result of plastic deformation, closing pores, permeability loss; and since the friction material acts more as thermal insulator, such conditions lead to local overheating, shudder, glazing, structural friction material damage, hot spotting and judder. Heavily relying on friction modifier additives to avoid stick/slip (shudder) behavior may only temporarily produce the desired effects. For example, as the friction modifier additive concentration drops below a critical level due to depletion, the shudder amplitude increases.

Sintered metallic friction materials have much better heat transfer capability and heat resistance and are capable of taking high overload without structural damage. Moreover, an optimized load distribution is achieved by abrasive wear. However, sintered metallic friction materials are less cost effective, since the applied load distribution is slightly different for each engagement. Abrasive wear is much less effective as compared to elastic deformation to avoid the local overloading. Since fluid is squeezed between two solid bodies, much higher local fluid pressure (hard-EHL vs. soft-EHL) leads to much higher heat generation as result of fluid shear, so even better heat conductivity may not be enough to support the film, a higher kinematic viscosity fluid may be required (with an additional loss of efficiency) and resulting in a lower torque capacity.

Woven carbon fiber friction materials have benefits and drawbacks that are somewhere in the middle between cellulose/Kevlar/resin based and sintered friction materials.

Thus, there is a need for a new and improved torque transmitting device that takes advantage of the benefits of the above referenced friction materials and limits the disadvantages.

SUMMARY

In an aspect of the present invention, a clutch is provided. The clutch has a reaction plate, a friction plate, a friction layer, at least one non-compressible member, and a fluid lubricant. The reaction plate exerts a compression force. The friction plate is disposed adjacent the reaction plate for frictionally engaging the reaction plate to transfer a driving torque between the reaction plate and the friction plate when the compression force is applied. The friction layer is attached to the friction plate and opposes the reaction plate. The friction layer has a coefficient of friction that is sufficient to prevent relative rotation of the reaction and friction plates when the friction layer is compressed by the reaction plate. The friction layer has at least one groove. The at least one non-compressible member is disposed in the at least one groove for preventing further compression of the friction layer by the reaction plate. The at least one non-compressible member is adhered to the friction plate and a fluid lubricant is disposed between the reaction plate and the friction plate for providing a lubrication barrier between the plates.

In another aspect of the present invention, the friction plate and the at least one non-compressible member include at least one aperture for allowing the fluid lubricant to pass through the friction plate and the at least one non-compressible member to contact the reaction plate.

In yet another aspect of the present invention, the three grooves in the friction layer have three non-compressible members disposed in each of the three grooves for preventing further compression of the friction layer by the reaction plate.

In yet another aspect of the present invention, the at least one non-compressible member is made primarily of metal.

In yet another aspect of the present invention, the friction layer is made primarily of a porous material that allows the lubricating fluid to move through the friction layer.

In yet another aspect of the present invention, the friction layer is a compressible resilient material that will return to an initial height of the friction layer prior to being compressed by the reaction plate.

In yet another aspect of the present invention, the friction layer is made substantially of a woven carbon fiber.

In yet another aspect of the present invention, the at least one non-compressible member has a height that is less than a thickness of the friction layer before the friction layer is compressed by the reaction plate.

In yet another aspect of the present invention, the at least one non-compressible member has a predefined height that prevents the friction layer from being plastically deformed.

In still another aspect of the present invention, the at least one non-compressible member has a predefined height that is substantially equal to the thickness of the friction material layer after the friction layer has been compressed when the clutch is in a high speed slip operating condition.

In still another aspect of the present invention, the at least one non-compressible member has a predefined height that is greater than the thickness of the friction material layer after the friction layer has been compressed when the clutch is in a low speed slip operating condition.

Further areas of applicability will become apparent from the description provided herein. It should be understood that the description and specific examples are intended for purposes of illustration only and are not intended to limit the scope of the present disclosure.

DESCRIPTION OF THE PREFERRED EMBODIMENTS

Figure 1:
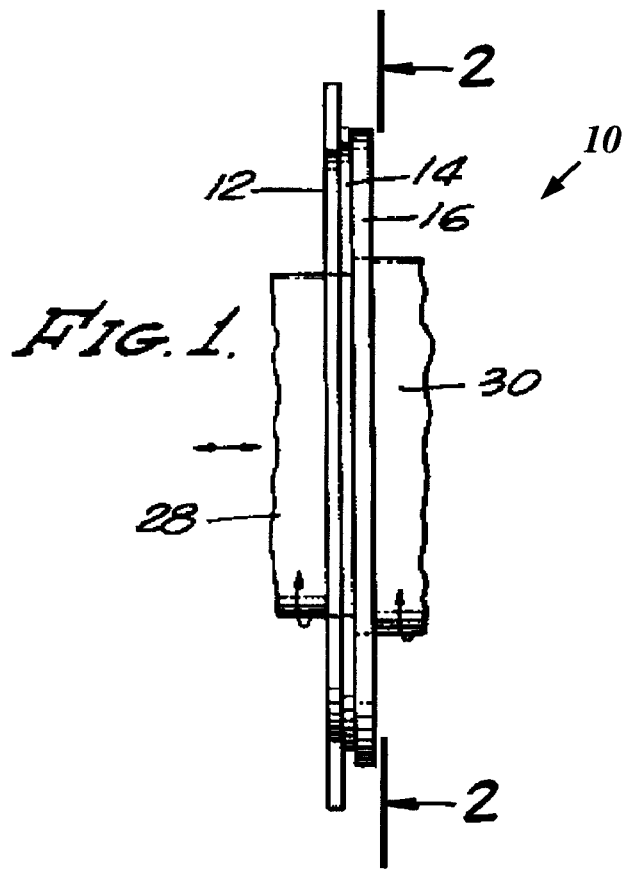
FIG. 1 is a side view of a torque transmitting device connected between a drive shaft and a driven shaft, in accordance with an embodiment of the present invention.

Referring to the drawings, wherein like reference numbers refer to like components, in FIG. 1 a side view of a torque-transmitting device 10 is illustrated, in accordance with an embodiment of the invention. Torque-transmitting device 10 is commonly referred to in automotive applications as a clutch or brake. Device 10 has a first plate or friction plate 12 and a second plate or reaction plate 16. Friction plate 12 is separated from reaction plate 16 by a layer of lubrication fluid 14. Fluid lubricant 14 disposed between the reaction plate 16 and the friction plate 12 provides a lubrication barrier between the plates. Torque-transmitting device 10 is connected between a drive shaft 28 and a driven shaft 30. More specifically, friction plate 12 is coupled to drive shaft 28 and reaction plate 16 is coupled to driven shaft 30. Drive shaft 28 is typically connected to a torque-producing device such as an internal combustion engine (not shown). Driven shaft 30 may be connected to a planetary gearset (not shown) for transmitting a driving torque from the engine to the planetary gearset to drive the road wheels of a vehicle. Both friction plate 12 and reaction plate 16 are planar and have a substantially circular shape. Further, plates 12 and 16 are made of steel or similar material. However, the teachings of the present invention may be applied to plates made of other materials, such as metal alloys, composites and the like.

Figure 2:
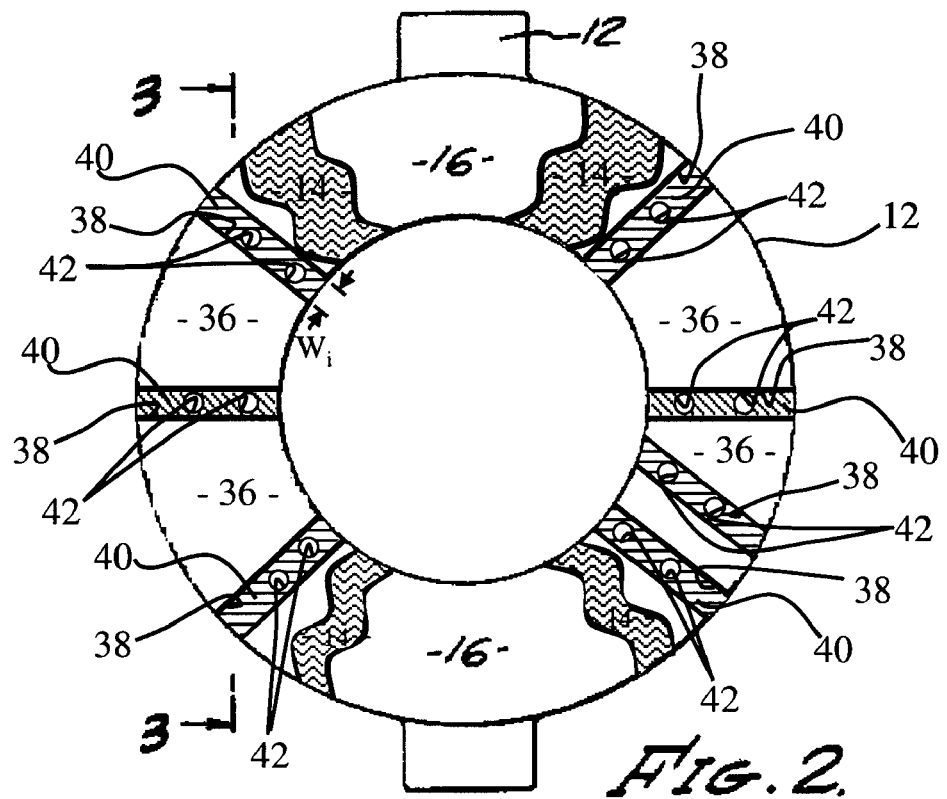
FIG. 2 is a partial cutaway view of the torque transmitting device of FIG. 1, in accordance with an embodiment of the present invention.

Referring now to FIG. 2, a partial cutaway view of the torque transmitting device 10 of FIG. 1 is illustrated, in accordance with an embodiment of the present invention. Portions of reaction plate 16 have been removed to reveal the lubrication layer 14 and a friction material layer 36. Friction material layer 36 is adhered to a surface of the friction plate 12. Friction material layer 36 is one of a variety of friction materials currently in use in torque transmitting mechanisms today. For example, in an embodiment of the invention friction material layer 36 is the friction material shown and described in U.S. Pat. No. 5,676,577 issued to Robert Chi-Chiu Lam and Yih Fang Chen and assigned to Borg-Warner Automotive, Inc of Sterling Heights, Mich., and hereby incorporated by reference. Further, friction material layer 36 may be made of a friction material offered by Borg-Warner Automotive, Inc of Sterling Heights, Mich. having the product identification number BW-6500. However, the present invention contemplates that friction material layer 36 is made of cellulose, Kevlar, resin, sintered metal, woven carbon fiber or any combination of these materials in varying percentages by weight that may or may not be in use in clutch applications currently. Friction material layer 36 is a porous layer that allows lubricating fluid 14 to move through layer 36. Further, friction material layer 36 is a compressible resilient material that will return to its initial height and shape prior to being compressed by reaction plate 16, if layer 36 is not compressed beyond its elastic limit.

In another embodiment of the present invention, grooves 38 are formed in friction material layer 36. The depth of grooves 38 is substantially equal to the thickness of the friction material layer 36. Preferably, at least three grooves are formed in friction material layer 36. However, the present invention contemplates that fewer than three or more than three grooves maybe formed in friction material layer 36. Moreover, grooves 38 are spaced apart and disposed circumferentially around friction plate 12. The present invention contemplates that grooves 38 are formed to extend radially out from the center of plate 12 or are disposed on an angle relative to a line passing through the center of plate 12 and extending radially outward.

Further, in a preferred embodiment of the present invention, a ridge or insert member 40 is placed in each of the grooves 38. Insert member 40, for example is a separate component that is adhered to friction plate 12. Insert member 40 is made of carbon fiber, steel, a metal alloy or similar material. In an embodiment of the present invention, the width $W_i$ of the insert members 40 is no wider than a typical lubrication fluid groove width in a conventional friction plate. Furthermore, width $W_i$ of insert 40 is dimensioned to be sufficient to accommodate any overloading received from clutch engagement.

Preferably, insert member 40 includes a plurality of apertures 42. Apertures 42 extend through friction plate 12 and are configured to receive and transport lubrication fluid 14 to the interface of the friction plate 12 and reaction plate 16.

Figure 3:
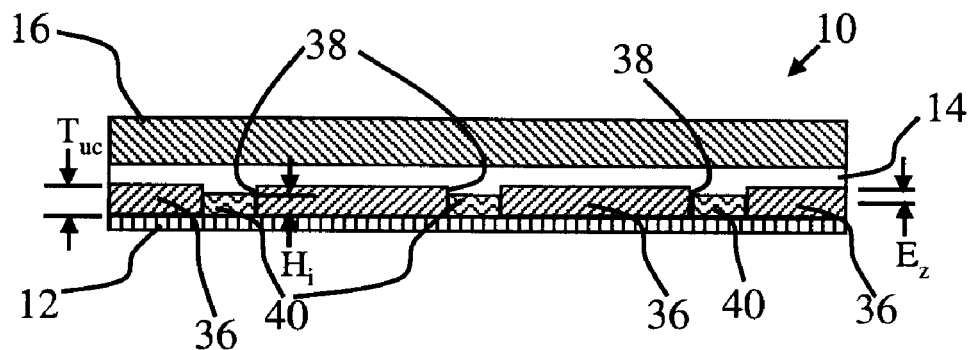
FIG. 3 is a cross-sectional view of the torque transmitting device of FIG. 1 at a location shown in FIG. 2 and in an initial engagement condition, in accordance with an embodiment of the present invention.

Referring now to FIG. 3, a cross-sectional view of the torque transmitting device 10 of FIG. 1 at a location shown in FIG. 2 and at initial engagement is illustrated, in accordance with an embodiment of the present invention. At initial engagement, friction material layer 36 preferably has an uncompressed thickness $T_{uc}$ that is greater than the height $H_i$ of insert members 40. Thus, grooves 38 exist at initial engagement. Grooves 38 promote the flow of lubrication fluid 14 through torque transmitting device 10 and work to break through the hydrodynamic film and avoid hydroplaning. An important characteristic of friction material layer 36 is the elastic property of layer 36. More specifically, friction material layer 36 should have an elastic zone $E_z$ that extends from its uncompressed thickness $T_{uc}$ to just below the height of the insert members 40, as referenced in FIG. 3. When friction material layer 36 is compressed to a thickness such that the top surface of friction material layer 36 is within elastic zone $E_z$, layer 36 will remain resilient and return to its initial thickness when uncompressed. Further, insert members 40 are specifically configured to ensure that friction material layer 36 is not compressed below elastic zone $E_z$ by preventing reaction plate 16 from moving closer to friction plate 12. In other words, friction plate 12 and reaction plate 16 will move towards each other until reaction plate 16 contacts insert members 40 attached to friction plate 12.

Figure 4:
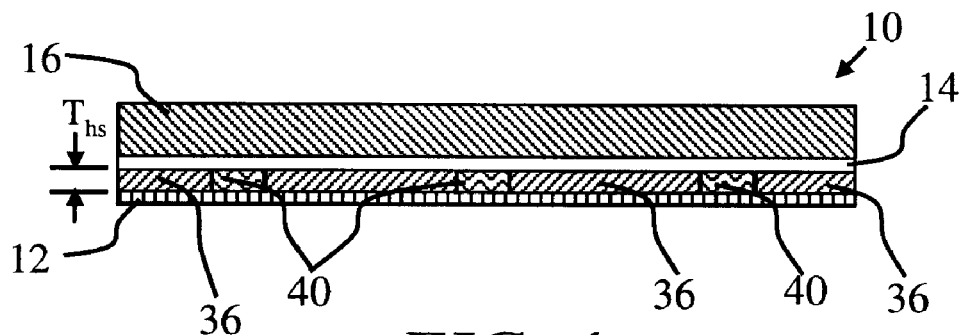
FIG. 4 is a cross-sectional view of the torque transmitting device of FIG. 1 at a location shown in FIG. 2 and in a high speed slip condition, in accordance with an embodiment of the present invention.

As shown in FIG. 4, a cross-sectional view of the torque transmitting device 10 of FIG. 1 at a location shown in FIG. 2 and during high speed slip, in accordance with an embodiment of the present invention. As the load on reaction plate 16 reaches its maximum capacity grooves 38 will disappear, friction material layer 36 will transfer the majority of the torque in elastic deformation region with initial or close to initial permeability, and insert members 40 will carry some of the torque. More specifically, during high speed slip friction material layer 36 is compressed such that the thickness $T_{hs}$ of the friction material is substantially equal to the height of insert members 40. In this condition, grooves 38 are no longer present. Insert members 40 have a predefined height $H_i$ that prevents friction material layer 12 from being compressed beyond its elastic deformation range or zone $E_z$. Moreover, insert members 40 will provide parallelism between friction plate 12 and reaction plate 16 resulting in an enhanced load distribution. Further, insert members 40 will absorb any additional temporary loading, thus avoiding friction material plastic deformation and permeability loss.

Figure 5:
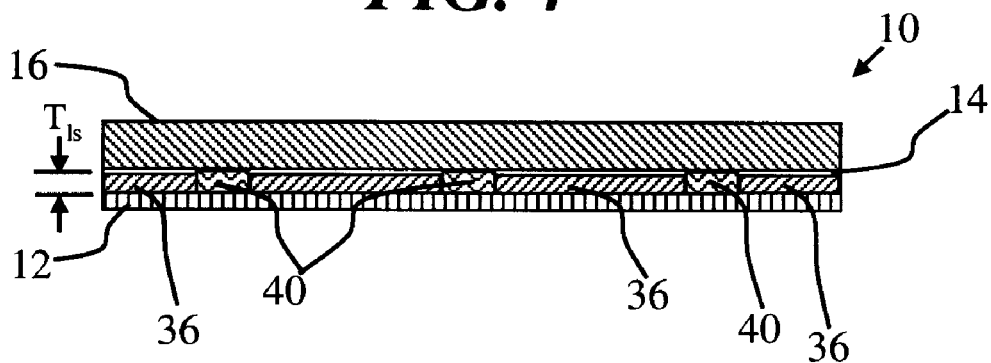
FIG. 5 is a cross-sectional view of the torque transmitting device of FIG. 1 at a location shown in FIG. 2 and in a low speed slip condition, in accordance with an embodiment of the present invention.

Reference is now made to FIG. 5, a cross-sectional view of the torque transmitting device 10 of FIG. 1 at a location shown in FIG. 2 and during low speed slip. During low speed slip friction material layer 36 is compressed such that the thickness $T_{ls}$ of the friction material is slightly below the height of insert members 40. In this condition, grooves 38 are no longer present. Moreover, friction material layer 36 is fully compressed and at its elastic deformation limit. If friction material layer 36 were compressed beyond its elastic deformation limit, layer 36 would enter plastic deformation. Friction material layer 36 would lose its resilience if it enters plastic deformation. However, the present invention ensures that friction material layer will not be plastically deformed by providing insert members 40 having a predefined height $H_i$ that prevents reaction plate 16 from further compressing friction material layer 36 beyond its elastic deformation zone $E_z$.

Thus, the present invention has many advantages and benefits over the prior art. Moreover, the teachings of the present invention may be employed to overcome many problems found in prior art torque transmitting devices. For example, the present invention overcomes the problem of shudder and other problems discussed in a technical paper authored by Robert C. Lam, Bulent Chavdar, and Tim Newcomb, *New Generation Friction Materials and Technologies* and published by The Society of Automotive Engineers (Ref. # SAE 2006-01-0150), hereby incorporated by reference.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A clutch comprising:
   a reaction plate for exerting a compression force;
   a friction plate disposed adjacent the reaction plate for frictionally engaging the reaction plate to transfer a driving torque between the reaction plate and the friction plate when the compression force is applied;
   a compressible resilient friction layer attached to the friction plate and opposing the reaction plate, the friction layer has a coefficient of friction that is sufficient to prevent relative rotation of the reaction and friction plates when the friction layer is compressed by the reaction plate, wherein the friction layer has a thickness, and wherein the friction layer has at least one groove;
   at least one non-compressible member disposed in the at least one groove for preventing further compression of the friction layer by the reaction plate, wherein the at least one non-compressible member is adhered to the friction plate, and wherein the at least one non-compressible member has a predefined height; and
   a fluid lubricant disposed between the reaction plate and the friction plate for providing a lubrication layer between the plates; and
   wherein the friction plate and the at least one non-compressible member further comprise at least one aperture for allowing the fluid lubricant to pass through the friction plate and the at least one non-compressible member to contact the reaction plate, and
   wherein the predefined height of the at least one non-compressible member is greater than the thickness of the friction material layer after the friction layer has been compressed when the clutch is in a low speed slip operating condition.

2. The clutch of claim 1 further comprising three grooves in the friction layer having three non-compressible members disposed in each of the three grooves for preventing further compression of the friction layer by the reaction plate.

3. The clutch of claim 1 wherein the at least one non-compressible member is made primarily of metal.

4. The clutch of claim 1 wherein the friction layer is made primarily of a porous material that allows the lubricating fluid to move through the friction layer.

5. The clutch of claim 4 wherein the friction layer will return to an initial height of the friction layer prior to being compressed by the reaction plate.

6. The clutch of claim 4 wherein the friction layer is made of a woven carbon fiber based material.

7. The clutch of claim 1 wherein the at least one non-compressible member has a height that is less than a thickness of the friction layer before the friction layer is compressed by the reaction plate.

8. The clutch of claim 1 wherein the at least one non-compressible member has a predefined height that prevents the friction layer from being plastically deformed.

9. The clutch of claim 1 wherein the at least one non-compressible member has a predefined height that is substantially equal to the thickness of the friction material layer after the friction layer has been compressed when the clutch is in a high speed slip operating condition.

10. A clutch comprising:
    a reaction plate for exerting a compression force;
    a friction plate disposed adjacent the reaction plate for frictionally engaging the reaction plate to transfer a driving torque between the reaction plate and the friction plate when the compression force is applied;
    a compressible friction layer attached to the friction plate and opposing the reaction plate, the friction layer having a coefficient of friction that is sufficient to prevent relative rotation of the reaction and friction plates when the friction layer is compressed by the reaction plate, wherein the friction layer has a thickness, and wherein the friction layer has at least one groove extending radially from the inner periphery of the friction plate to the outer periphery of the friction plate;
    at least one non-compressible member disposed in the at least one groove for preventing further compression of the friction layer by the reaction plate, wherein the at least one non-compressible member is adhered to the friction plate, and wherein the at least one non-compressible member has a predefined height; and a fluid lubricant disposed between the reaction plate and the friction plate for providing a lubrication layer between the plates; and wherein the friction plate and the at least one non-compressible member further comprise at least one aperture for allowing the fluid lubricant to pass through the friction plate and the at least one non-compressible member to contact the reaction plate, wherein the at least one non-compressible member has a predefined height that is substantially equal to the thickness of the friction material layer after the friction layer has been compressed when the clutch is in a high speed slip operating condition, and wherein the at least one non-compressible member has a predefined height that is greater than the thickness of the friction material layer after the friction layer has been compressed when the clutch is in a low speed slip operating condition.

11. The clutch of claim 10 further comprising three grooves in the friction layer having three non-compressible members disposed in each of the three grooves for preventing further compression of the friction layer by the reaction plate.

12. The clutch of claim 10 wherein the at least one non-compressible member is made primarily of metal and wherein the friction layer is made primarily of a porous material that allows the lubricating fluid to move through the friction layer.

13. The clutch of claim 10 wherein the friction layer is made of a woven carbon fiber based material.

14. The clutch of claim 10 wherein the at least one non-compressible member has a height that is less than a thickness of the friction layer before the friction layer is compressed by the reaction plate.

15. The clutch of claim 10 wherein the at least one non-compressible member has a predefined height that prevents the friction layer from being plastically deformed.

* * * * *